United States Patent
Abbasi et al.

[19]

[11] Patent Number: 5,881,756
[45] Date of Patent: Mar. 16, 1999

[54] PROCESS AND APPARATUS FOR HOMOGENEOUS MIXING OF GASEOUS FLUIDS

[75] Inventors: Hamid A. Abbasi, Darien; Mark J. Khinkis, Morton Grove; David F. Cygan, Villa Park, all of Ill.

[73] Assignee: Institute of Gas Technology, Des Plaines, Ill.

[21] Appl. No.: 577,901

[22] Filed: Dec. 22, 1995

[51] Int. Cl.⁶ .................................................. G05D 11/03
[52] U.S. Cl. .......................... 137/9; 137/599; 137/602; 137/890; 137/896
[58] Field of Search ............................ 137/3, 9, 101.19, 137/101.21, 599, 602, 890, 896

[56] References Cited

U.S. PATENT DOCUMENTS

| | | | |
|---|---|---|---|
| 434,492 | 8/1890 | Ward | 137/890 |
| 689,814 | 12/1901 | Dow . | |
| 3,718,426 | 2/1973 | Harris . | |
| 4,100,733 | 7/1978 | Striebel et al. . | |
| 4,189,294 | 2/1980 | Rice et al. . | |
| 4,378,206 | 3/1983 | Kullendorf et al. . | |
| 4,455,840 | 6/1984 | Matt et al. . | |
| 4,609,342 | 9/1986 | Showalter . | |
| 4,761,077 | 8/1988 | Werner | 137/896 |
| 4,838,295 | 6/1989 | Smith et al. | 137/101.19 X |
| 4,887,963 | 12/1989 | LeMer . | |
| 4,967,561 | 11/1990 | Bruhwiler et al. . | |
| 5,361,586 | 11/1994 | McWhirter et al. . | |

OTHER PUBLICATIONS

Chemineer, "Kenics HEV High Efficiency Static Mixer", Bulletin 811.

Osama Badr, "Flame Propagation in Stratified Methane–Air Mixtures", Journal of Fire Sciences, vol. 2, Nov./Dec. 1984, pp. 415–426.

*Primary Examiner*—Stephen M. Hepperle
*Attorney, Agent, or Firm*—Speckman Pauley Petersen & Fejer

[57] ABSTRACT

A process and apparatus for premixing a gaseous fuel and air, the apparatus comprising a back plate having a plurality of back plate openings, a front plate having a plurality of front plate openings corresponding to and substantially aligned with the back plate openings, a gaseous fuel inlet through in which a gaseous fuel is introduced into the area between the back plate and the front plate, and a plurality of air jet tubes disposed between the back plate and the front plate, the air jet tubes conveying combustion air from said back plate openings through said front plate openings, resulting in aspiration of the fuel through the front plate openings.

30 Claims, 2 Drawing Sheets

PROCESS AND APPARATUS FOR HOMOGENEOUS MIXING OF GASEOUS FLUIDS

BACKGROUND OF THE INVENTION

1. Field of the Invention

This invention relates to an apparatus and process for providing a homogeneous mixture of two gaseous fluids. More particularly, this invention relates to an apparatus and process for providing a homogeneous mixture of a gaseous fuel and oxidant, preferably air, to a combustor.

2. Description of Prior Art

Premixing of fuel and air is becoming more and more attractive as one of the most effective methods for reducing $NO_x$ formation in combustion processes. As the fuel/air ratio changes within a combustor, the $NO_x$ formed by the combustor changes due to variation in the peak flame temperature and the availability of oxygen as the fuel/air ratio is altered. Premixing of fuel and air minimizes the formation of pockets of higher flame temperatures and oxygen availability within the flame, both of which promote higher $NO_x$ formation. In general, premixing also intensifies combustion and, in certain burner designs, enhances internal combustion products recirculation, thereby providing stable combustion from highly fuel-lean to highly fuel-rich conditions. To achieve the best results, it is desired to mix the fuel and air as completely as possible prior to ignition.

Numerous mixers and mixing devices are known for premixing fuel and combustion air. Mixing devices for this purpose are generally grouped in two classifications: manual mixers which require manual adjustments to maintain a desired fuel/air ratio as rates of flow are changed, and automatic mixers which automatically maintain within their rated capacity a substantially constant fuel/air ratio over a range of flow rates. Within the classification of automatic mixers are gas jet mixers which utilize the kinetic energy of a jet of gas issuing from an orifice to entrain all or part of the air required for combustion, air jet mixers which utilize the kinetic energy of a stream of air issuing from an orifice to entrain the gas required for combustion, and mechanical mixers which utilize mechanical means to mix gas and air, neglecting entirely any kinetic energy in the gas and air, and compressing the resultant mixture to a pressure suitable for delivery to its point in use.

In general, mixer designs without any internal obstructions are termed "open" mixers. These mixers require a long downstream region for complete mixing, thereby creating a large quantity of combustible mixture which, in turn, increases the potential for flashback and/or explosion.

Accordingly, to enhance mixing in a much shorter downstream region, there also exist mixer designs which utilize internal baffles and diverters. However, the major disadvantage of these designs is the repercussion of flashback. If flashback were to occur, the flame front would travel upstream of the internal baffles and then be trapped.

Finally, in either mixer design, no means for compensation of non-uniform or skewed profile air flow conditions which are common in real applications is provided. As a result, there exists a need for rapid mixers having no downstream restrictions and having the capability of compensating for non-uniform or skewed air flow profiles.

U.S. Pat. No. 3,718,426 to Harris teaches a burner comprising a bundle of tubular elements, each of which is open at each of its ends, for the supply of combustion air to the burner. Each of the tubular elements is provided at one end with a head portion having an external cross-section such that when the bundle of tubular elements are bunched together with their head portions in contact with each other, fuel orifices are formed between the head portions for fuel supply to the burner. The burner further comprises a housing which defines a fuel chamber and a fuel inlet for introducing fuel into the fuel chamber. The bundle of tubular elements are bunched together in the fuel chamber in a laterally spaced, substantially parallel relationship. The back wall of the housing is provided with a plurality of circular openings for receiving the circular non-headed ends of the tubular members and the front wall of the housing is provided with a hexagonal opening in which the enlarged head portions of the bunched tubular elements are located in contact with each other, the head portions of the outer ring of the tubular elements being in close contact with the edges defining the hexagonal opening. As fuel is fed into the fuel chamber, it circulates around the tubular elements and passes out of the chamber through the fuel orifices formed between the head portions of the tubular elements. When the fuel issuing from the fuel orifices is ignited, the burning fuel causes combustion air to be drawn through the tubular elements by induction to mix with the issuing gas or other fuel to produce the required flame. Accordingly, ignition of the fuel causes the induction of combustion air through the tubular elements for mixing with the fuel issuing from the fuel chamber.

U.S. Pat. No. 4,100,733 to Striebel et al. teaches an apparatus for supplying fuel to the combustion chamber of a gas turbine engine comprising a fuel chamber defined by an upstream wall and a downstream wall through which a plurality of mixing tubes extend to flow air through the fuel chamber. Each of the primary mixing tubes is in communication with the fuel chamber through fuel orifices formed by the primary mixing tubes. Fuel, under pressure, is introduced from the fuel chamber through the fuel orifices into the mixing tubes in which it mixes with the air flowing therethrough.

U.S. Pat. No. 5,361,586 to McWhirter et al. teaches a gas turbine combustor having a plurality of concentrically arranged annular passages, each having an inlet and a discharge end, a first fuel discharge port for each of the annular passages for introducing a fuel therein, and means for separately controlling the introduction of fuel into each of the annular passages through its fuel discharge port. In accordance with one embodiment, means for separately controlling the introduction of fuel into each of the annular passages through its respective fuel discharge port comprises an approximately toroidal manifold for each of the annular passages, each of the toroidal manifolds being disposed upstream of its respective annular passage.

U.S. Pat. No. 4,967,561 to Brühwiler et al. teaches a gas turbine combustion chamber having an air distribution chamber and a combustion space locationally separated from one another within a combustion chamber shell. A plurality of tubular elements is located between the distribution chamber and the combustion space in which elements of premixing and pre-evaporation of fuel oil supplied through premixing nozzles and/or a premixing of a fuel gas supplied through the premixing nozzles takes place with compressor air. Each tubular element is provided with a flame holder in the direction of the combustion space. A diffusion nozzle for fuel directed into the combustion space is located within the flame holder. In operation, only a small part of the fuel supplied to each element is burned by means of the diffusion nozzle, the major proportion, on the other hand, being burned by means of the premixing nozzles.

U.S. Pat. No. 4,887,963 to LeMer teaches a gas burner comprising an air box, one wall of which is perforated with a large number of closely spaced orifices, a gas feed tank connected to a pressurized fuel gas source, and a plurality of hollow needles, each connecting the inside of the feed tank to the central zone of the inlet of an orifice in the perforated wall so as to define within this orifice one of a plurality of flame production sites. The air box is connected to a pressurized air source, the orifices are cylindrical, and a mechanical obstacle is provided in the center of the outlet of each orifice for deflecting the gas jet leaving the needle and mixing it with the airstream which surrounds it.

U.S. Pat. No. 4,455,840 to Matt et al. teaches a ring burner for a ring combustion chamber divided into a large number of honeycomb-like parallel axis canals for the combustion air, by radial and circumferential plate canals, or by radial plate canals, longitudinal tubing, radial tubing and annular tubing into which combustion gas is introduced from nozzles in the surrounding walls. At the burner outlet, fuel retention nozzles are provided above the frontal surface area of the plate canals or tubes. The fuel nozzles are provided in front of the burner inlet for operation as a dual-fuel burner with gaseous and liquid fuels.

U.S. Pat. No. 4,378,206 to Kullendorff et al. teaches a fluidized bed combustion chamber having a perforated bottom plate into which air nozzles are pressed in a manner similar to that used for tubes in a tube sheet of a heat exchanger. About one-third of the nozzles are connected to a start-up or auxiliary combustion chamber for blowing in hot gas for heating the bed to the flash-point or ignition temperature of the fuel.

U.S. Pat. No. 4,189,294 to Rice et al. teaches a flameless combustion burner having an ignition zone, a catalyst zone, and a plenum. To obtain flameless combustion, a fuel and a combustion supporting gas are introduced into the ignition zone from the plenum and a flame is initiated by means of a starting device. The products of combustion flow over the catalyst to heat it to a temperature at which it can initiate a flameless combustion.

U.S. Pat. No. 689,814 to Dow teaches a burner having a gas chamber provided with burner tubes, a plurality of mixing tubes discharging into the gas chamber, automatic or self-closing valves operably linked to the mixing tubes to prevent backflow from the gas chamber, means for introducing gaseous fuel under pressure through the mixing tubes, and means for independently controlling the inflow of fuel in connection with the respective mixing tubes.

SUMMARY OF THE INVENTION

It is an object of this invention to provide a means for homogeneous mixing of two gaseous fluids, such as a gaseous fuel and oxidant supplied to a combustor.

It is another object of this invention to provide a means for homogeneous mixing of a gaseous fuel and oxidant whereby a more uniform oxygen and temperature distribution within a combustor are provided to reduce $NO_x$ formation.

It is another object of this invention to provide a gaseous fuel/oxidant mixer for a gaseous fuel/oxidant combustor which automatically proportions fuel flow to oxidant flow.

It is another object of this invention to provide a gaseous fuel/oxidant mixer for a gaseous fuel/oxidant combustor in which mixing of the fuel and oxidant is carried out in a single stage.

These and other objects of this invention are achieved by an apparatus for mixing at least two gaseous fluids comprising separation means for separating a first gaseous fluid into a plurality of first gaseous fluid streams, aspiration means for aspirating a second gaseous fluid into each of said first gaseous fluid streams disposed downstream of said separation means, the amount of said second gaseous fluid aspirated into each of said first gaseous fluid streams being substantially in proportion to a first gaseous fluid flow rate in a corresponding said first gaseous fluid stream, and mixing means for mixing said first gaseous fluid and said second gaseous fluid disposed downstream of said aspiration means.

The apparatus in accordance with one preferred embodiment of this invention comprises a first gaseous fluid plenum, a mixed gaseous fluid plenum, a plurality of tubular members connecting said first gaseous fluid plenum to said mixed gaseous fluid plenum and providing a communication therebetween, and a second gaseous fluid plenum in communication with each of said tubular members whereby a first gaseous fluid flowing from said first gaseous fluid plenum through each of said tubular members aspirates a second gaseous fluid from said second gaseous fluid plenum. In accordance with a particularly preferred embodiment, each of said tubular members forms a plurality of aspiration openings whereby a portion of said second gaseous fluid is aspirated into the interior of each of said tubular members.

A gaseous fluid mixer in accordance with another preferred embodiment of this invention comprises a back plate having a plurality of back plate openings, a front plate having a plurality of front plate openings corresponding to and substantially aligned with the back plate openings, means for introducing a gaseous fluid into the area between the back plate and the front plate, and jet means for aspirating the gaseous fluid through the plurality of front plate openings, said jet means disposed between the back plate and the front plate.

In accordance with yet another preferred embodiment of this invention, the gaseous fluid mixer comprises at least one side wall, a front wall adjacent one end of the side wall and a back wall adjacent the opposite end of the side wall, the side wall, front wall and back wall enclosing a gaseous fluid chamber. The front wall forms a plurality of front wall openings and the back wall forms a plurality of back wall openings corresponding to and aligned with the front wall openings. The gaseous fluid mixer further comprises gaseous fluid means for introducing a gaseous fluid into the gaseous fluid chamber and aspiration means for aspirating the gaseous fluid from within the gaseous fluid chamber through the plurality of front wall openings, downstream of which it mixes with a second gaseous fluid.

A process for mixing a first gaseous fluid and a second gaseous fluid in accordance with one embodiment of this invention comprises separating said first gaseous fluid into a plurality of first gaseous fluid streams; aspirating a second gaseous fluid into each of said first gaseous fluid streams, the amount of said second gaseous fluid aspirated into said first gaseous fluid streams being substantially in proportion to the first gaseous fluid flow rate in a corresponding said first gaseous fluid stream; and mixing said first gaseous fluid and said second gaseous fluid.

More particularly, the driving fluid (first gaseous fluid) is split into a plurality of streams. The kinetic energy of each individual stream is used to aspirate a substantially proportional amount of aspirated fluid (second gaseous fluid). If the flow profile of the driving fluid is non-uniform, that is some streams have a higher flow than other streams, the higher flow streams will aspirate more aspirated fluid than the lower flow streams.

The process for mixing a first gaseous fluid and a second gaseous fluid in accordance with yet another preferred embodiment of this invention comprises introducing a first gaseous fluid between a back plate having a plurality of back plate openings and a front plate having a plurality of front plate openings. A second gaseous fluid is injected through the plurality of front plate openings in a manner which aspirates the first gaseous fluid from between the back plate and the front plate through the plurality of front plate openings. The first gaseous fluid and the second gaseous fluid mix rapidly downstream of the plurality of front plate openings.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
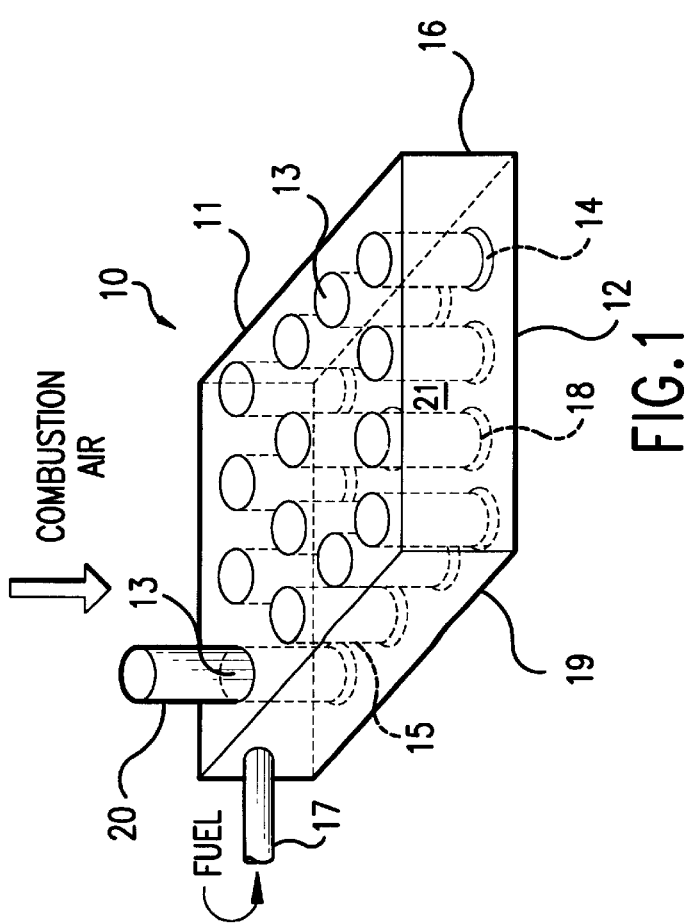
FIG. 1 is a schematic diagram of an in-line fuel/oxidant mixer in accordance with one embodiment of this invention.

A single stage, in-line fuel/air mixer for providing a homogeneous mixture of fuel and air to a combustor, thereby providing a more uniform oxygen and temperature distribution within the combustor to reduce $NO_x$ formation, in accordance with one preferred embodiment of the gaseous fluid mixer of this invention, is shown in FIG. 1. In accordance with this embodiment, mixer 10 comprises back plate 11 having a plurality of back plate openings 13. Front plate 12 forms a plurality of front plate openings 14 which correspond in number and alignment with back plate openings 13.

Disposed between back plate 11 and front plate 12 is a plurality of air tubes or nozzles 15 through which combustion air is conveyed from back plate openings 13 through front plate openings 14. Fuel is introduced into the area between back plate 11 and front plate 12 through fuel inlet means 17. As a result, when mixer 10 is in operation, fuel is distributed within the area between back plate 11 and front plate 12 and among nozzles 15. Combustion air at any available pressure is broken down into individual jets as the air passes through back plate openings 13 within back plate 11. Preferably, the maximum possible velocity is achieved and is constant through each nozzle 15. The stream of combustion air moving at high speed through nozzles 15 creates a suction as it exits through front plate ends 18 of nozzles 15 disposed proximate front plate openings 14. The suction thus created draws fuel from within the area disposed between back plate 11 and front plate 12 through front plate openings 14. The amount of fuel aspirated through each front plate opening 14 is directly related to the amount of combustion air flowing through the corresponding nozzle 15. Accordingly, the more air which is supplied through a given nozzle 15, the more fuel will be aspirated by the combustion air through the corresponding front plate opening. By controlling the amount of combustion air flowing through each of the plurality of nozzles 15, the pattern of mixing of the combustion air and fuel on downstream side 19 of front plate 12 can be controlled.

By effectively breaking down the fuel and combustion air into a plurality of fuel and air streams, the effective mixing length of the mixer is significantly increased over the mixing length of a single nozzle having the same nozzle length as the nozzles 15 of the mixer 10 of this invention. The primary benefits of the mixer 10 of this invention in combustion applications are, thus, two-fold —namely the ability to self-adjust and maintain a substantially matched profile of fuel flow to air flow and the ability to produce rapid mixing of the fuel and combustion air.

In order to prevent air from entering the area between back plate 11 and front plate 12, air tubes or nozzles 15 are sealingly secured to back plate 11, suitable sealing means being provided between each nozzle 15 and a corresponding back plate opening 13. As shown in FIG. 1, the ends of nozzles 15 are secured to back plate 11 so as to enclose each back plate opening 13. Thus, combustion air flowing from the upstream side of back plate 11 flows through nozzles 15 and does not enter the area between back plate 11 and front plate 12.

In accordance with one embodiment, the ends of nozzles 15 facing back plate 11 extend through back plate openings 13 and are sealed by sealing means around the periphery of the nozzle extension 20 as it passes through back plate opening 13.

In accordance with one preferred embodiment of this invention, back plate 11 and front plate 12 are constructed of sheet metal and nozzles 15 are sealingly secured to back plate 11 by welds.

Figure 2:
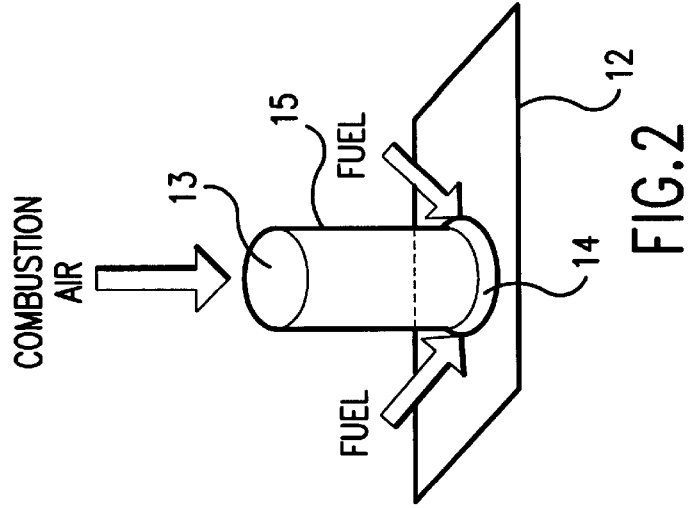
FIG. 2 is an enlargement of a portion of an in-line fuel/oxidant mixer in accordance with one embodiment of this invention.

In accordance with a preferred embodiment of this invention, back plate openings 13 and front plate openings 14 are circular. In addition, to ensure aspiration of the fuel through front plate openings 14, the diameter of circular front plate openings 14 is greater than the outside diameter of the ends of nozzles 15 extending toward the front plate 12. In this way, as shown in FIG. 2, fuel is aspirated through the gap between the exterior of nozzle 15 and the periphery of front plate opening 14 as combustion air flows through nozzle 15.

In accordance with one preferred embodiment of this invention, the mixer 10 comprises at least one side wall 16, front wall 12 adjacent one end of side wall 16 and back wall 11 adjacent the opposite end of side wall 16. In this manner, said at least one side wall 16, front wall 12 and back wall 11 enclose fuel chamber 21 into which a fuel is introduced through fuel inlet means 17. Front wall 12 forms a plurality of front wall openings 14 and back wall 11 forms a plurality of back wall openings 13, said back wall openings 13 corresponding to and substantially aligned with front wall openings 14. Disposed within fuel chamber 21 are aspiration means for aspirating the fuel through front wall openings 14.

Figure 3:
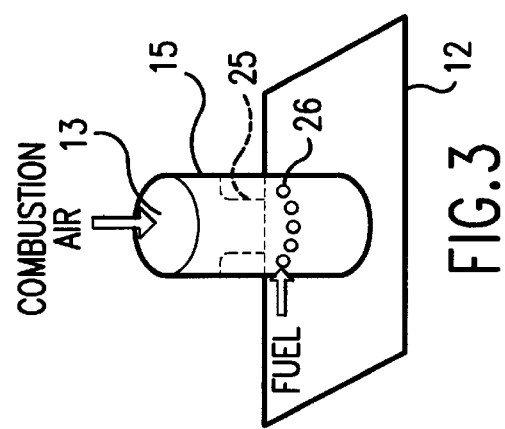
FIG. 3 is an enlargement of a portion of an in-line fuel/oxidant mixer in accordance with another embodiment of this invention.

FIG. 3 shows an enlargement of the jet means for aspirating a gaseous fuel in accordance with another preferred embodiment of this invention in which nozzle 15 is sealed, in addition to back wall opening 13, within front wall opening 14. Nozzle 15 in accordance with this embodiment forms a plurality of aspiration openings 26 in the portion of the wall of nozzle 15 disposed between back wall 11 and front wall 12, thereby providing a communication between the interior of nozzle 15 and fuel chamber 21. Means for reducing the interior diameter of nozzle 15 are provided within nozzle 15 upstream of aspiration openings 26, thereby creating a venturi effect which causes aspiration of the gaseous fluid within chamber 21 through aspiration openings 26 into the interior of nozzle 15. Said reduction in the interior diameter of nozzle 15 may be achieved by any means known to those skilled in the art. In accordance with one embodiment of this invention, said interior diameter reduction is achieved by a thickening of the walls of nozzle 15 in the region immediately upstream of aspiration openings 26.

Figure 5:
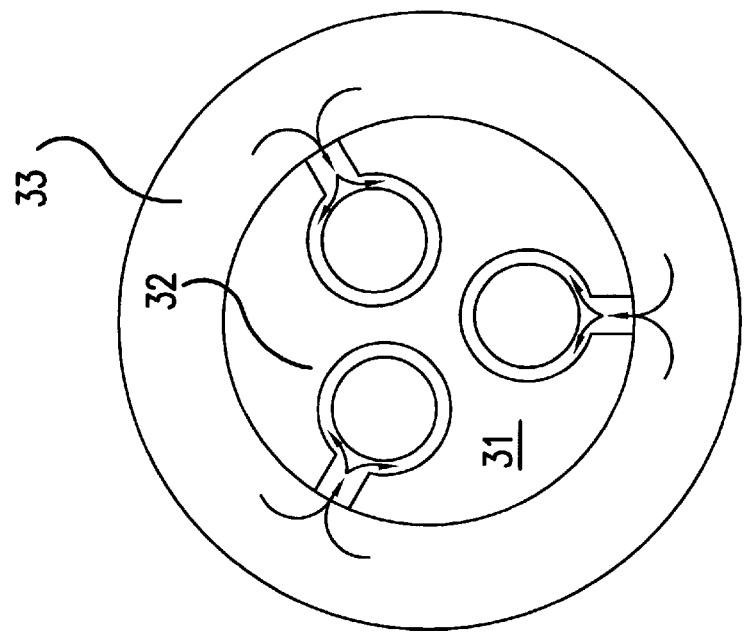
FIG. 5 is a schematic diagram of an end view of the downstream end of the in-line gaseous fluid mixer in accordance with the embodiment of FIG. 4.
Figure 4:
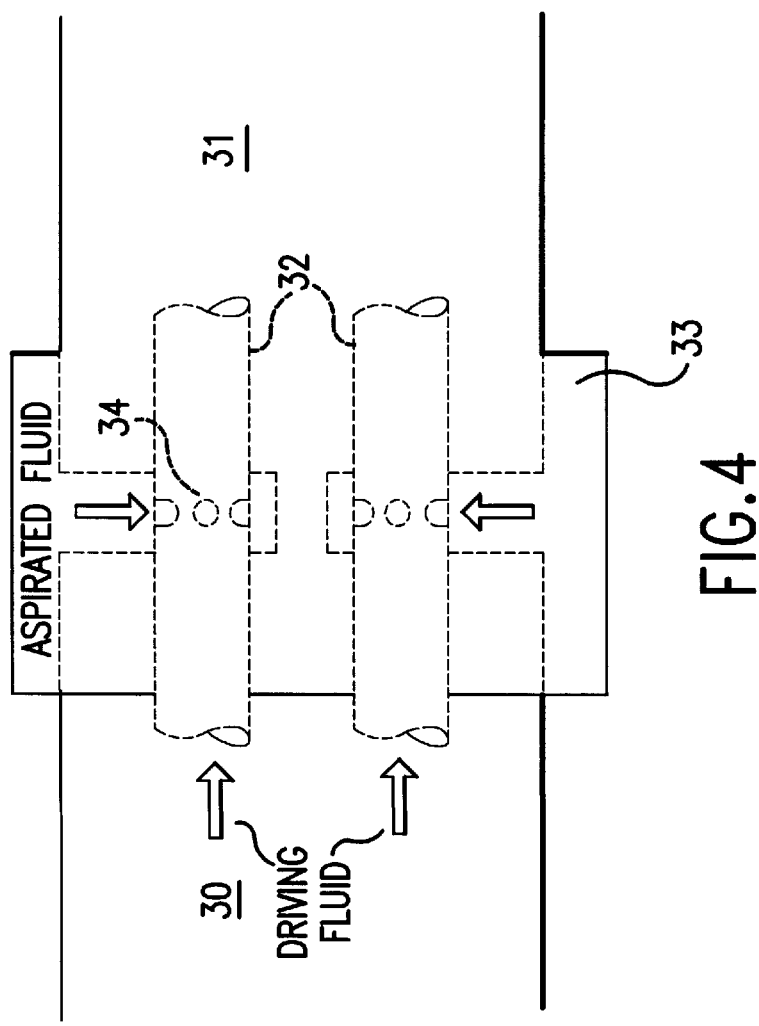
FIG. 4 is a schematic diagram of a side view of an in-line gaseous fluid mixer in accordance with another embodiment of this invention.

FIGS. 4 and 5 show a gaseous fluid mixer in accordance with yet another preferred embodiment of this invention comprising a first gaseous fluid plenum 30, a mixed gaseous fluid plenum 31, a plurality of tubular members 32 connecting said first gaseous fluid plenum 30 to said mixed gaseous fluid plenum 31 and providing a communication therebetween, and a second gaseous fluid plenum 33 in communication with each of said tubular members 32 whereby a first gaseous fluid flowing from said first gaseous fluid plenum 30 through each of said tubular members 32 aspirates a second gaseous fluid from said second gaseous fluid plenum 33. In accordance with a particularly preferred embodiment, each of said tubular members 32 forms a plurality of aspiration openings 34 whereby a portion of said second gaseous fluid is aspirated into the interior of each of said tubular members 32.

The mixer of this invention is preferably used for mixing a gaseous fuel and oxidant for combustion. However, it will be apparent to those skilled in the art that the mixer of this invention may be employed for homogeneous mixing of any two or more gaseous fluids.

The process for mixing two gaseous fluids in accordance with one embodiment of this invention comprises introducing a first gaseous fluid between back plate 11 and front plate 12, back plate 11 having a plurality of back plate openings 13 and front plate 12 having a plurality of front plate openings 14. A second gaseous fluid is injected through the plurality of front plate openings 14 whereby the first gaseous fluid within chamber 21 is aspirated from between back plate 11 and front plate 12 through the plurality of front plate openings 14, resulting in mixing of the two gaseous fluids, downstream of the plurality of front plate openings 14. In accordance with a particularly preferred embodiment of this invention, the pressure of the second gaseous fluid within chamber 21 is substantially constant over a range of first gaseous fluid flow rates.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus for mixing at least two gaseous fluids comprising:

separation means for separating a first gaseous fluid into a plurality of first gaseous fluid streams;

aspiration means for aspirating a second gaseous fluid into each of said first gaseous fluid streams disposed downstream of said separation means, the amount of said second gaseous fluid aspirated into each of said first gaseous fluid streams being substantially in proportion to a first gaseous fluid flow rate in a corresponding said first gaseous fluid stream; and mixing means for mixing said first gaseous fluid and said second gaseous fluid disposed downstream of said aspiration means.

2. An apparatus in accordance with claim 1, wherein said separation means comprises a back plate having a plurality of back plate openings, a first gaseous fluid tube sealingly secured one of in and around each of said back plate openings to said back plate and extending from a downstream side of said back plate, and first gaseous fluid supply means for supplying said first gaseous fluid to an upstream side of said back plate.

3. An apparatus in accordance with claim 2, wherein said aspiration means comprises each of said first gaseous fluid tubes forming a plurality of aspiration openings on said downstream side of said back plate, said aspiration openings in communication with a second gaseous fluid supply.

4. An apparatus in accordance with claim 3, wherein said second gaseous fluid supply comprises a second gaseous fluid plenum.

5. An apparatus in accordance with claim 2, wherein said mixing means comprises a mixing chamber disposed on said downstream side of said back plate and in communication with an exit end of said first gaseous fluid tubes.

6. An apparatus in accordance with claim 2, wherein said first gaseous fluid supply means comprises a first gaseous fluid plenum, said first gaseous fluid plenum in communication with said first gaseous fluid tubes.

7. An apparatus in accordance with claim 2 further comprising a front plate having a plurality of front plate openings corresponding to and substantially aligned with said back plate openings.

8. An apparatus in accordance with claim 7 further comprising second gaseous fluid means for introducing said second gaseous fluid between said back plate and said front plate.

9. An apparatus in accordance with claim 8, wherein said aspiration means comprises jet means for aspirating said second gaseous fluid through said plurality of front plate openings, said jet means disposed between said back plate and said front plate.

10. An apparatus in accordance with claim 9, wherein said jet means further comprises means for controlling the amount of said first gaseous fluid flowing through each said first gaseous fluid tube.

11. A gaseous fluid mixing apparatus comprising:

a first gaseous fluid plenum;

a mixed gaseous fluid plenum;

a plurality of tubular members connecting said first gaseous fluid plenum to said mixed gaseous fluid plenum and providing a communication between said first gaseous fluid plenum and said mixed gaseous fluid plenum; and a second gaseous fluid plenum in communication with each of said tubular members whereby a first gaseous fluid flowing from said first gaseous fluid plenum through said tubular members aspirates a second gaseous fluid from said gaseous fluid plenum into said mixed gaseous fluid plenum.

12. A gaseous fluid mixing apparatus in accordance with claim 11, wherein each of said tubular members forms a plurality of aspiration openings, whereby a portion of said second gaseous fluid is aspirated into the interior of each of said tubular members.

13. A fuel/oxidant mixer for a gaseous fuel/oxidant combustor, said fuel/oxidant mixer comprising:

a back plate having a plurality of back plate openings;

a front plate having a plurality of front plate openings corresponding to and substantially aligned with said back plate openings;

gaseous fuel means for introducing said gaseous fuel between said back plate and said front plate; and jet means for aspirating said gaseous fuel through said plurality of front plate openings, said jet means disposed between said back plate and said front plate.

14. A fuel/oxidant mixer in accordance with claim 13, wherein said jet means comprises an oxidant tube sealingly secured one of in and around each of said back plate openings to said back plate, said oxidant tubes extending proximate said front plate and providing an oxidant communication between each said back plate opening and said corresponding front plate opening.

15. A fuel/oxidant mixer in accordance with claim 14, wherein said jet means further comprises means for controlling the amount of oxidant flowing through each said oxidant tube.

16. A fuel/oxidant mixer in accordance with claim 13 further comprising enclosure means for substantially enclosing said area between said back plate and said front plate.

17. A fuel/oxidant mixer in accordance with claim 13, wherein said back plate openings and said front plate openings are circular in shape.

18. A fuel/oxidant mixer for premixing a gaseous fuel and oxidant in a combustor comprising:

at least one side wall, a front wall adjacent one end of said side wall and a back wall adjacent an opposite end of said side wall, said at least one side wall, said front wall and said back wall enclosing a fuel chamber;

said front wall forming a plurality of front wall openings;

said back wall forming a plurality of back wall openings, said back wall openings corresponding to and aligned with said front wall openings;

fuel means for introducing said gaseous fuel into said fuel chamber; and aspiration means for aspirating said gaseous fuel through said plurality of front wall openings.

19. A fuel/oxidant mixer in accordance with claim 18, wherein said aspiration means comprises an oxidant nozzle sealingly secured to said back wall around each said back wall opening.

20. A fuel/oxidant mixer in accordance with claim 19, wherein said oxidant nozzles extend from said back wall a suitable distance toward said corresponding front wall openings whereby fuel is aspirated from said fuel chamber through said front wall openings by oxidant jets emitted by said oxidant nozzles.

21. A gaseous fluid mixer for homogeneous mixing of two gaseous fluids comprising:

a back plate having a plurality of back plate openings;

a front plate having a plurality of front plate openings corresponding to and substantially aligned with said back plate openings;

driving gaseous fluid jet means for aspirating a driving gaseous fluid through said plurality of front plate openings, said driving gaseous fluid jet means disposed between said back plate and said front plate; and gaseous fluid means for introducing said driving gaseous fluid between said back plate and said front plate.

22. A gaseous fluid mixer in accordance with claim 21, wherein said driving gaseous fluid jet means comprises a fluid tube sealingly secured around each of said back plate openings to said back plate, said fluid tubes extending proximate said front plate and providing a fluid communication between each said back plate opening and said corresponding front plate opening.

23. A gaseous fluid mixer in accordance with claim 22, wherein said driving gaseous fluid jet means further comprises means for controlling the amount of said driving gaseous fluid flowing through each said fluid tube.

24. A gaseous fluid mixer in accordance with claim 22 further comprising enclosure means for substantially enclosing said area between said back plate and said front plate.

25. A gaseous fluid mixer in accordance with claim 22, wherein said back plate openings and said front plate openings are circular in shape.

26. A process for mixing a gaseous fuel and an oxidant comprising:

introducing said gaseous fuel between a back plate having a plurality of back plate openings and a front plate having a plurality of front plate openings;

injecting said oxidant through said plurality of front plate openings whereby said gaseous fuel is aspirated from between said back plate and said front plate through said plurality of front plate openings; and mixing said gaseous fuel and said oxidant downstream of said plurality of front plate openings.

27. A process in accordance with claim 26, wherein said oxidant is selected from the group consisting of air, oxygen, and oxygen-enriched air.

28. A process for mixing two gaseous fluids comprising:

separating a first gaseous fluid into a plurality of first gaseous fluid streams;

aspirating a second gaseous fluid into each of said first gaseous fluid streams, the amount of said second gaseous fluid aspirated into each of said first gaseous fluid streams being substantially in proportion to a first gaseous fluid flow rate in a corresponding said first gaseous fluid stream; and mixing said first gaseous fluid and said second gaseous fluid.

29. A process in accordance with claim 28, wherein said second gaseous fluid is maintained at a substantially constant pressure over a range of flow rates of said first gaseous fluid streams.

30. A process in accordance with claim 28, wherein said first gaseous fluid is introduced between a back plate of a first gaseous fluid chamber having a plurality of back plate openings and a front plate of said first gaseous fluid chamber having a plurality of front plate openings, said second gaseous fluid is injected through said plurality of front plate openings whereby said first gaseous fluid is aspirated from between said back plate and said front plate through said plurality of front plate openings, and said first gaseous fluid and said second gaseous fluid are mixed downstream of said plurality of front plate openings.

* * * * *